(12) United States Patent
Adamson et al.

(10) Patent No.: US 10,093,411 B1
(45) Date of Patent: Oct. 9, 2018

(54) APPARATUS AND METHOD FOR REDUCING A SONIC BOOM SIGNATURE

(71) Applicant: The Boeing Company, Chicago, IL (US)

(72) Inventors: Eric E. Adamson, Newcastle, WA (US); David A. Treiber, Seattle, WA (US)

(73) Assignee: The Boeing Company, Chicago, IL (US)

( * ) Notice: Subject to any disclaimer, the term of this patent is extended or adjusted under 35 U.S.C. 154(b) by 975 days.

(21) Appl. No.: 14/217,547

(22) Filed: Mar. 18, 2014

(51) Int. Cl.
*B64C 23/04* (2006.01)
*B64C 30/00* (2006.01)

(52) U.S. Cl.
CPC .............. *B64C 23/04* (2013.01); *B64C 30/00* (2013.01)

(58) Field of Classification Search
CPC .......... B64C 23/04; B64C 23/06; B64C 30/00
See application file for complete search history.

(56) References Cited

U.S. PATENT DOCUMENTS

| | | | | |
|---|---|---|---|---|
| 2,950,879 A * | 8/1960 | Smith | .................... | B64C 30/00 244/198 |
| 2,967,030 A * | 1/1961 | Whitcomb | .............. | B64C 23/06 244/130 |
| 3,370,810 A * | 2/1968 | Shevell | .................... | B64C 23/06 244/199.2 |
| 3,417,946 A * | 12/1968 | Hartley | .................... | B64C 5/02 244/124 |
| 4,067,518 A * | 1/1978 | Paterson | .................. | B64C 23/00 244/130 |
| 4,291,853 A * | 9/1981 | Sigalla | .................... | B64C 23/06 244/199.1 |
| 4,643,376 A * | 2/1987 | Vanderhoeven | ........ | B64C 23/04 244/130 |
| 8,302,912 B2 * | 11/2012 | Wood | ..................... | B64C 23/04 244/130 |

* cited by examiner

*Primary Examiner* — Richard R Green
(74) *Attorney, Agent, or Firm* — Miller, Matthias & Hull LLP

(57) ABSTRACT

An apparatus and method using an interference body to shape a sonic boom signature is provided herein. The interference body can be installed on various control surfaces, including a vertical control surface. The interference body can be sized and positioned to create a desired amount of interference with expansion wave s generated by one or more components of an aircraft. In one configuration, the interference body can be operative to reduce the sonic boom formed by an aircraft operating at or above supersonic speeds.

11 Claims, 9 Drawing Sheets

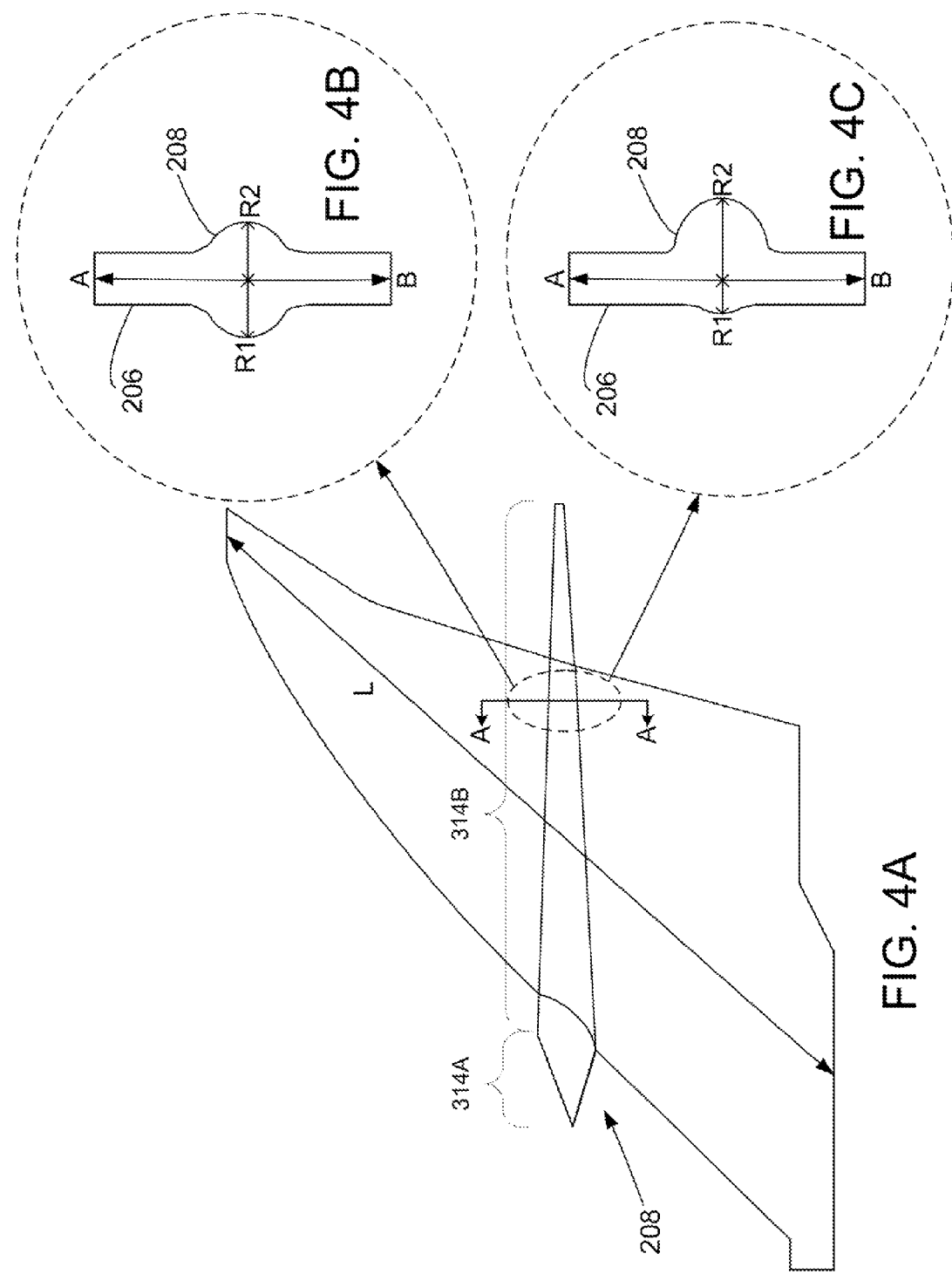

APPARATUS AND METHOD FOR REDUCING A SONIC BOOM SIGNATURE

BACKGROUND

When an aircraft pass through the air, it creates pressure waves in front of it and behind it in much the same way the bow and stern of a boat create waves. These pressure waves travel at the speed of sound. The pressure waves in the front of the aircraft create a rise in pressure (compression) followed by a decrease to a negative pressure at the tail, ending in a sudden return to the ambient air pressure. Above the speed of sound, the aircrafts radiated compression waves are heard on the ground as an explosion or sonic boom. This "overpressure profile" is known as an N-wave because of its shape.

The "boom" is experienced when there is a sudden change in pressure, therefore an N-wave causes two booms—one when the initial pressure rise from the nose hits, and another when the tail passes and the pressure suddenly returns to normal. This leads to a distinctive "double boom" from a supersonic aircraft. The power, or volume, of the shock waves is dependent on the quantity of air that is being compressed, accelerated, and recompressed, and thus, dependent on the size and shape of the aircraft. The "length" of the boom from front to back is dependent on the length of the aircraft to a power of 3/2. The longer the aircraft, the more "spread out" their booms, which are a therefore less powerful boom.

Because of the often extreme levels of noise heard on the ground as a result of the sonic boom, flight overland at speeds approaching and beyond the speed of sound is severely limited. Current Federal Aviation Administration regulations prohibit any commercial supersonic flight overland. The regulations were promulgated at a time when typical supersonic aircraft had cruise sonic boom signatures that were perceived by the public at large to be unacceptably loud. A feature many of these aircraft had in common was a pressure signature in cruise, that when propagated to the ground, coalesced into two distinct nose and tail shocks, e.g. an N-wave. Because of the sonic boom generated by conventional aircraft during supersonic flight operations, flight times overland are typically increased because aircraft are regulated to fly at lower speeds.

It is with respect to these and other considerations that the disclosure herein is presented.

SUMMARY

It should be appreciated that this Summary is provided to introduce a selection of concepts in a simplified form that are further described below in the Detailed Description. This Summary is not intended to be used to limit the scope of the claimed subject matter.

According to one embodiment disclosed herein, a method for interfering with an aircraft component expansion wave is provided. The method includes creating an interference compression wave with an interference body of the aircraft, the interference compression wave having predetermined properties associated with one or more properties of the expansion wave, and mitigating the one or more properties of the expansion wave by introducing the interference compression wave into the expansion wave.

According to another embodiment disclosed herein, an interference body for reducing a sonic boom is provided. The interference body includes an expander section operative to create an interference pattern to interfere with an expansion wave generated by a component of an aircraft, and, a closeout section operative to produce a benign terminal expansion of compression waves from the interference body.

According to yet another embodiment disclosed herein, an aircraft configured to have a reduced sonic boom signature is provided. The aircraft includes a control surface and an interference body installed on the control surface. The interference body includes an expander section operative to create an interference pattern to interfere with an expansion wave generated by a component of the aircraft, and a closeout section operative to produce a benign terminal expansion of compression waves from the interference body.

The features, functions, and advantages that have been discussed can be achieved independently in various embodiments of the present disclosure or may be combined in yet other embodiments, further details of which can be seen with reference to the following description and drawings.

BRIEF DESCRIPTION OF THE DRAWINGS

The embodiments presented herein will become more fully understood from the detailed description and the accompanying drawings, wherein:

FIG. 4A is a side view of a vertical control surface with an interference body according to at least one embodiment disclosed herein.

FIG. 4B is a cross-sectional view taken along the line A-A of FIG. 4A illustrating an interference body installed in a centerline configuration.

FIG. 4C is a cross-sectional view taken along the line A-A of FIG. 4A illustrating an interference body installed in an offset configuration.

The plurality of figures presented in this application illustrates variations and different aspects of the embodiments of the present disclosure. Accordingly, the detailed description on each illustration will describe the differences identified in the corresponding illustration.

DETAILED DESCRIPTION

The following detailed description is directed an apparatus and method for reducing a sonic boom signature of an aircraft using an interference body. The interference body can be installed on various surfaces of the aircraft. During flight, the interference body creates compression waves that interfere with the expansion waves generated by the aircraft features (wing, body, tails, and the like). The interference between the interference body compression waves and the aircraft expansion waves can shape at least a portion of the aircraft low pressure signature, thereby reducing the strength of the terminal recompression. The shaping of at least a portion of the aircraft expansion waves can be done in a manner to change the sonic boom signature in a beneficial or preferred manner. It should be appreciated that the present disclosure does not depend nor rely on any particular theory of operation.

Figure 1:
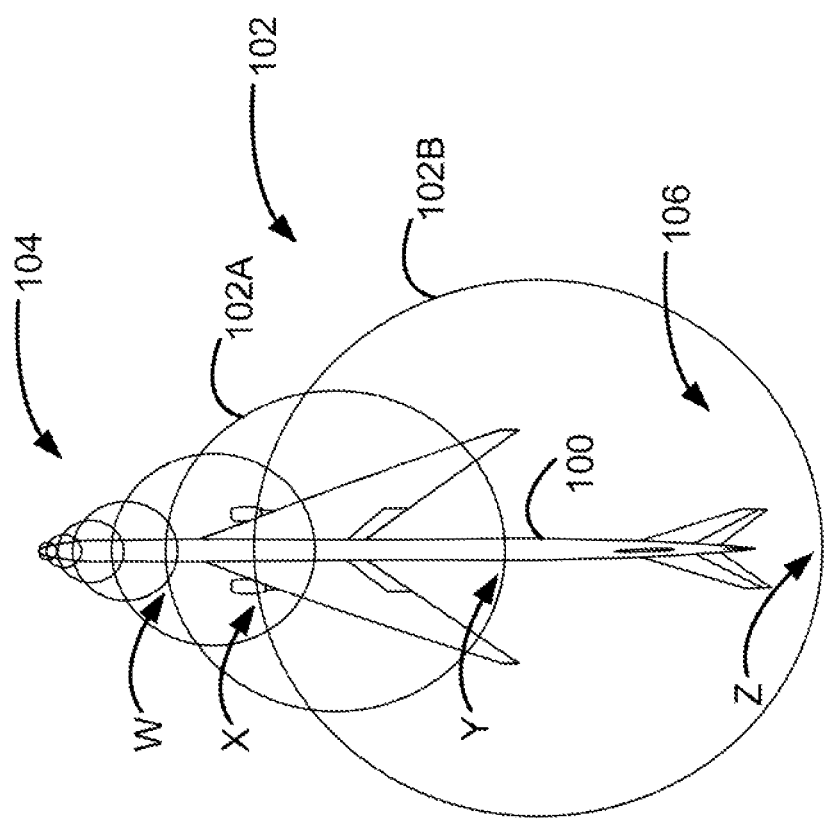
FIG. 1 is a top view of an aircraft providing a general overview of compression wave behavior at near supersonic speeds.

FIG. 1 is a top view of an aircraft 100 providing a general overview of compression wave behavior at near supersonic speeds. As the aircraft approaches the speed of sound, the distance between compression waves 102 formed from the aircraft body near the front 104 of the aircraft 100 begin to compress, while the compression waves 102 formed near the rear 106 of the aircraft are further spaced apart. For example, the distance between the leading edge W of compression wave 102A and the leading edge X of compression wave 102B is less than the distance between the trailing edge Y of the compression wave 102A and the trailing edge Z of the compression wave 102B. At speeds above the speed of sound, the distance between the leading edge W and the leading edge X is effectively zero. As mentioned briefly above, this change in pressure is heard on the ground as the nose sonic boom. A second boom, the tail sonic boom, is the result of the expanded waves abruptly returning to ambient air pressure, described in more detail in FIG. 2, below.

Figure 2:
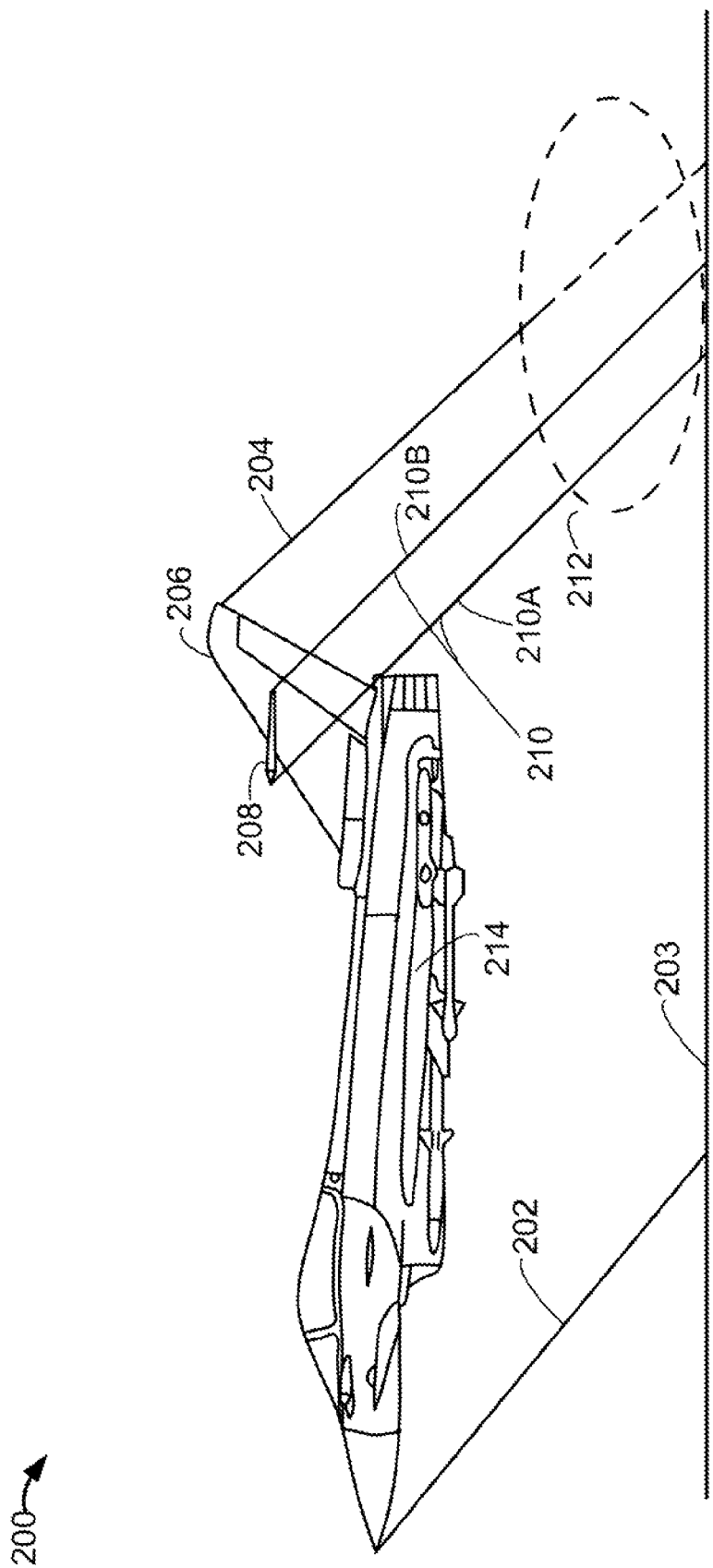
FIG. 2 is a side view of an aircraft configured to have a reduced sonic boom signature according to at least one embodiment disclosed herein.

FIG. 2 is a side view of an aircraft 200 configured to have a reduced sonic boom signature according to at least one embodiment disclosed herein. As the aircraft 200 moves through the air past supersonic speeds, the aircraft 200 produces a conical shock wave signature around the aircraft 200 at the nose formed from the circular compression waves, represented in part in FIG. 2 by nose compression wave 202. The nose compression wave 202 can travel from the aircraft 200 toward the ground 203, causing the first sound often experienced in a sonic boom. The differential pressure between the pressure of the nose and the pressure of the tail of the aircraft 200 can affect the noise level of the sonic boom.

Various components of the aircraft 200 aft of the nose of the aircraft 200 can create expansion waves, such as the tail expansion wave 204 created by a vertical control surface 206. As used herein, a "vertical" control surface is any control surface non-parallel to the horizontal plane of the aircraft 200. The nose compression wave 202 creates a rise in pressure followed by a decrease to negative pressure at the tail expansion wave 204, ending in a sudden return to ambient pressure as the N-wave moves past. This changing pressure profile results in a sound felt on the ground 203 akin to an explosion or a sonic boom. A larger pressure differential, e.g. a larger N-wave, can be perceived as a louder sonic boom.

To reduce the noise generated by the N-wave, an interference body 208 installed on the vertical control surface 206 can be used. During flight, the interference body 208 can create interference compression waves 210A and 210B (hereinafter referred to collectively and generically as the "interference compression waves 210). The interference compression waves 210 emanate from a leading portion of the interference body 208, interacting with a portion of the tail expansion wave 204 in an interference zone 212. It should be appreciated that the interference body 208 can be installed at various, suitable locations of the aircraft 200.

In the interference zone 212, the tail expansion wave 204 and the interference compression waves 210 interact with each other to alter one or more characteristics of the tail expansion wave 204, as indicated by the broken line associated with the tail expansion wave 204 downstream of the interference zone 212. Altering the tail expansion wave 204 affects the sonic boom signature, illustrated in further detail in FIG. 9 and discussed in detail below. In one embodiment, a portion of the energy of the tail expansion wave 204 is canceled or mitigated by the interference compression waves 210. By affixing the interference body 208 in a position that is aft, outboard, and/or above a majority of the aircraft 200, the interference body 208 can be tailored to produce the interference compression waves 210 that cancel or mitigate at least a portion of the energy of the tail expansion wave 204.

As mentioned briefly above, the interference body 208 can be positioned at various locations around the aircraft 200. The placement of the interference body 208 depends on the desired effect on the tail expansion wave 204. For example, the interference body 208, when located on the vertical control surface 206, can be used to cancel or mitigate at least a portion of the compression wave energy coming from the fuselage of the aircraft 200. Additionally, because the interference body 208 is located aft of the wing 214 of the aircraft 200, the interference compression waves 210 of the interference body 208 can cancel or mitigate at least a portion of compression wave energy coming from the wing 214.

Figure 3:
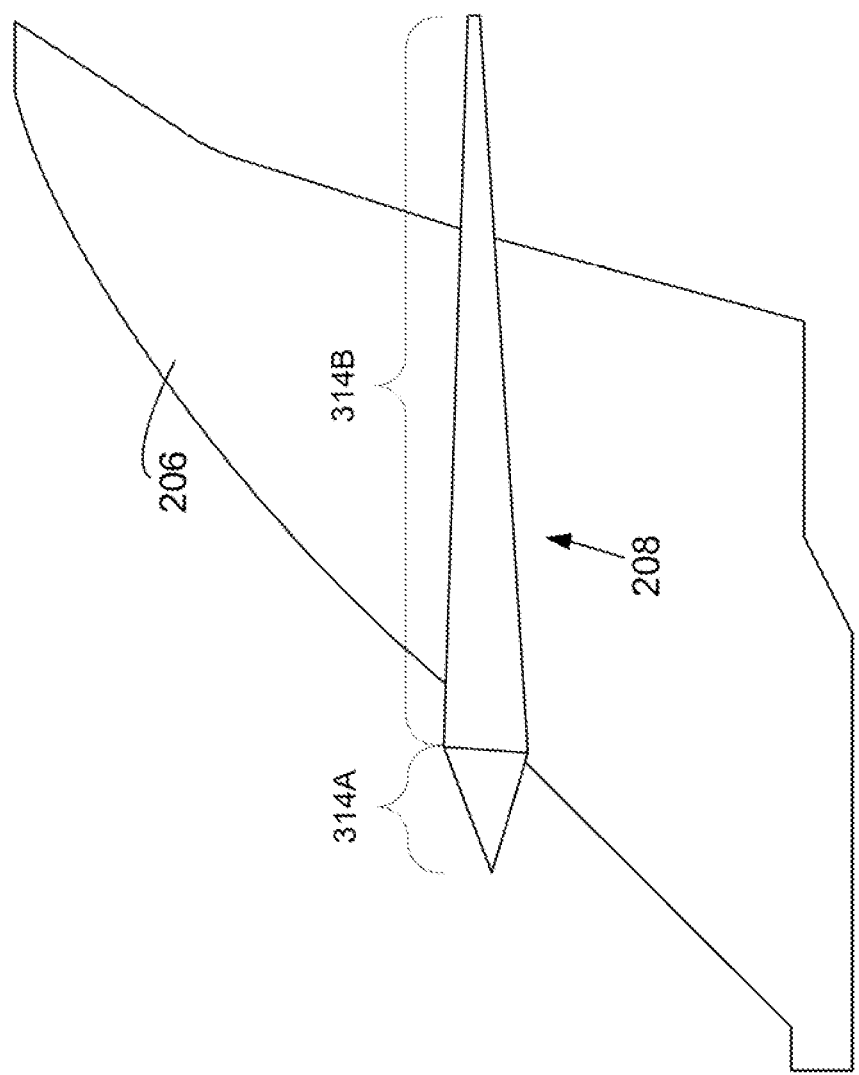
FIG. 3 is a side view of a vertical control surface with an interference body according to at least one embodiment disclosed herein.

FIG. 3 is a side view of the vertical control surface 206 with the interference body 208 according to at least one embodiment disclosed herein. The interference body 208 can include two general sections. A first general section includes an expander section 314A. The expander section 314A can be configured to generate a certain compression wave having desired characteristics when moving through the air at various speeds. In one example, the expander section 314A is operative to generate a desired compression wave ahead of the expander section 314A. In another example, the expander section 314A is operative to create an interference pattern to interfere with an expansion wave generated by a component of an aircraft, such as the tail expansion wave 204 created by the vertical control surface 206.

In one embodiment, the operation of the expander section 314A is, at least in part, due to a volumetric effect. As used herein, a "volumetric effect" is a result due at least in part to the volume of a container in a fluid. It should be understood that other physical characteristics of the interference body 208 may provide an input into the affect the interference body 208 has on the tail expansion wave 204. Some examples include, but are not limited to, the angle of the interference body 208 in relation to the direction of flight of the aircraft 200, the geometry of the interference body 208, and the like.

In the example illustrated in FIG. 3, a portion of the container may be the expander section 314A. A relatively large volume for the expander section 314A can produce compression waves of greater amplitude than an expander section 314A with a relatively smaller volume. The volume of the expander section 314A can be adjusted to account for the operational parameters of the aircraft 200. For example, a greater volume for the expander section 314A can produce larger amplitude compression waves to counteract large compression waves generated by certain parts of an aircraft.

In a similar manner, a smaller volume for the expander section 314A can produce relatively smaller amplitude compression waves to counteract relatively smaller compression waves generated by certain parts of an aircraft. As will be explained in FIGS. 5A and 5B, below, the location of the interference body 208 can also be adjusted.

The shape of the expander section 314A may vary depending on the particular configuration. In the example illustrated in FIG. 3, the expander section 314A has a generally conical shape. The shape of the expander section 314A may be adjusted to create various shapes and amplitudes of compression waves. For example, for a given volume, a relatively flat surface normal to the direction of air flow can produce a larger compression wave than a conical shaped surface. The expander section 314A may also be heterogeneously shaped. For example, a portion of the expander section 314A may be conical, whereas another portion of the expander section 314A may be flat. These and other configurations of the expander section 314A are considered to be within the scope of the present disclosure.

The interference body 208 can also include closeout section 314B. The closeout section 314B can be designed to reduce or mitigate the amplitude of compression waves emanating afterward from the interference body 208. In some configurations, the closeout section 314B can have a generally conical shape with a larger diameter proximate to the expander section 314A, and progressively reducing in diameter when moving further away in location from the expander section 314A. The conical shape of the closeout section 314B can produce a relatively benign terminal expansion of compression waves. In some examples, the closeout section 314B is operative to produce a benign terminal expansion of the compression waves from the interference body 208. As used herein, "benign" is used to indicate a condition in which the trailing compression waves produced by the interference body 208 are relatively small and do not appreciably contribute to the shock wave produced by an aircraft.

FIG. 4A is a side view of the vertical control surface 206 with the interference body 208 according to at least one embodiment disclosed herein. In some configurations, the interference body 208 may be installed along the length L of the vertical control surface 206, explained in more detail in FIGS. 5A and 5B. As illustrated in FIG. 3, above, the interference body 208 may include the expander section 314A and the closeout section 314B. The interference body 208 may be installed along the centerline of the vertical control surface 206, as illustrated in the cross-sectional view shown in FIG. 4B, or offset from the centerline of the vertical control surface 206, as illustrated in the cross-sectional view shown in FIG. 4C.

Shown in FIG. 4B a cross-sectional view taken along the line A-A of FIG. 4A illustrating the interference body 208 installed in a centerline configuration along the centerline AB of the vertical control surface 206. The interference body 208 is installed so that the radius R1 is equal to the radius R2. Shown in FIG. 4C is a cross-sectional view taken along the line A-A of FIG. 4A illustrating the interference body 208 installed in an offset configuration offset from the centerline AB of the vertical control surface 206. In this configuration, the interference body 208 is installed so that the radius R1 is less than the radius R2.

In some configurations, the centerline configuration may provide benefits over the offset configuration. For example, the centerline configuration may produce equivalent compression waves on either side of the vertical control surface 206. The offset configuration may provide some benefits as well, including, but not limited to, a larger compression wave production on one side of the vertical control surface 206. It should be understood that the present invention is not limited to any particular benefit, including those discussed briefly above.

Figure 5B:
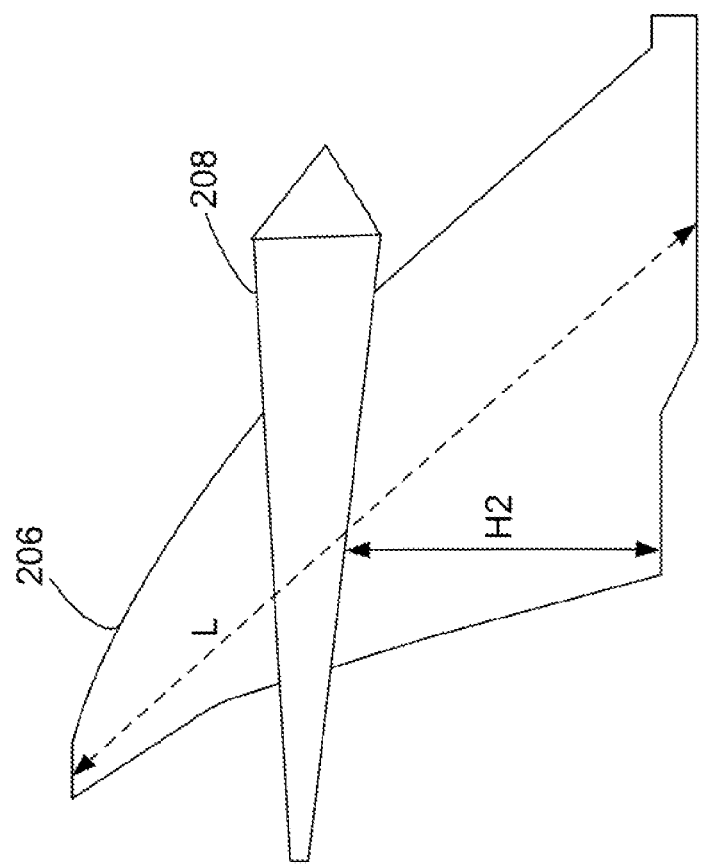
FIGS. 5A and 5B are side views of vertical control surfaces with interference bodies installed at different locations on the vertical control surface according to at least one embodiment disclosed herein.
Figure 5A:
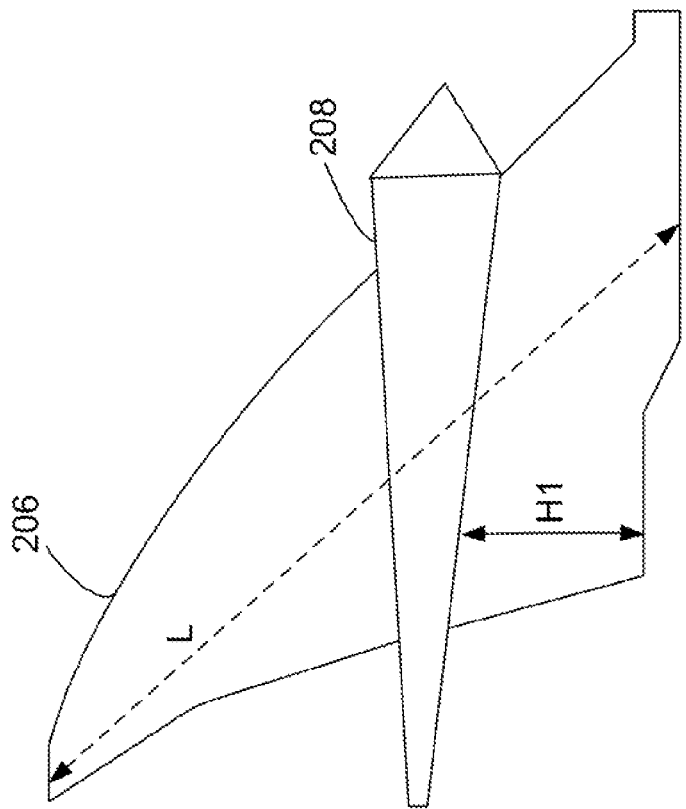

FIGS. 5A and 5B are side views the vertical control surface 206 with the interference body 208 installed at different locations on the vertical control surface 206 according to at least one embodiment disclosed herein. Referring to FIG. 5A, the vertical control surface 206 includes a length L. Installed on the vertical control surface 206 is the interference body 208. As illustrated in FIG. 5A, the interference body 208 is installed at a distance H1 above the bottom of the vertical control surface 206.

In FIG. 5B, the vertical control surface 206 is also defined by the length L. Installed on the vertical control surface 206 is the interference body 208. As illustrated in FIG. 5B, the interference body 208 is installed at a distance H2 above the bottom of the vertical control surface 206. Comparing the relative length of the distance H1 against the relative length of the distance H2, the interference body 208 in the configuration illustrated in FIG. 5B is installed at a greater length away from the body of an aircraft than the configuration illustrated in FIG. 5A.

Although not limited to any particular benefit, the configuration illustrated in FIG. 5A may provide better interference and sonic boom shaping when the compression waves are close to the fuselage of an aircraft. The configuration illustrated in FIG. 5B may be used to interfere with compression waves further away from the fuselage of an aircraft. Further, the configuration illustrated in FIG. 5B may be used to cause compression wave interference with components of the aircraft a distance away from fuselage of the aircraft.

Figure 6:
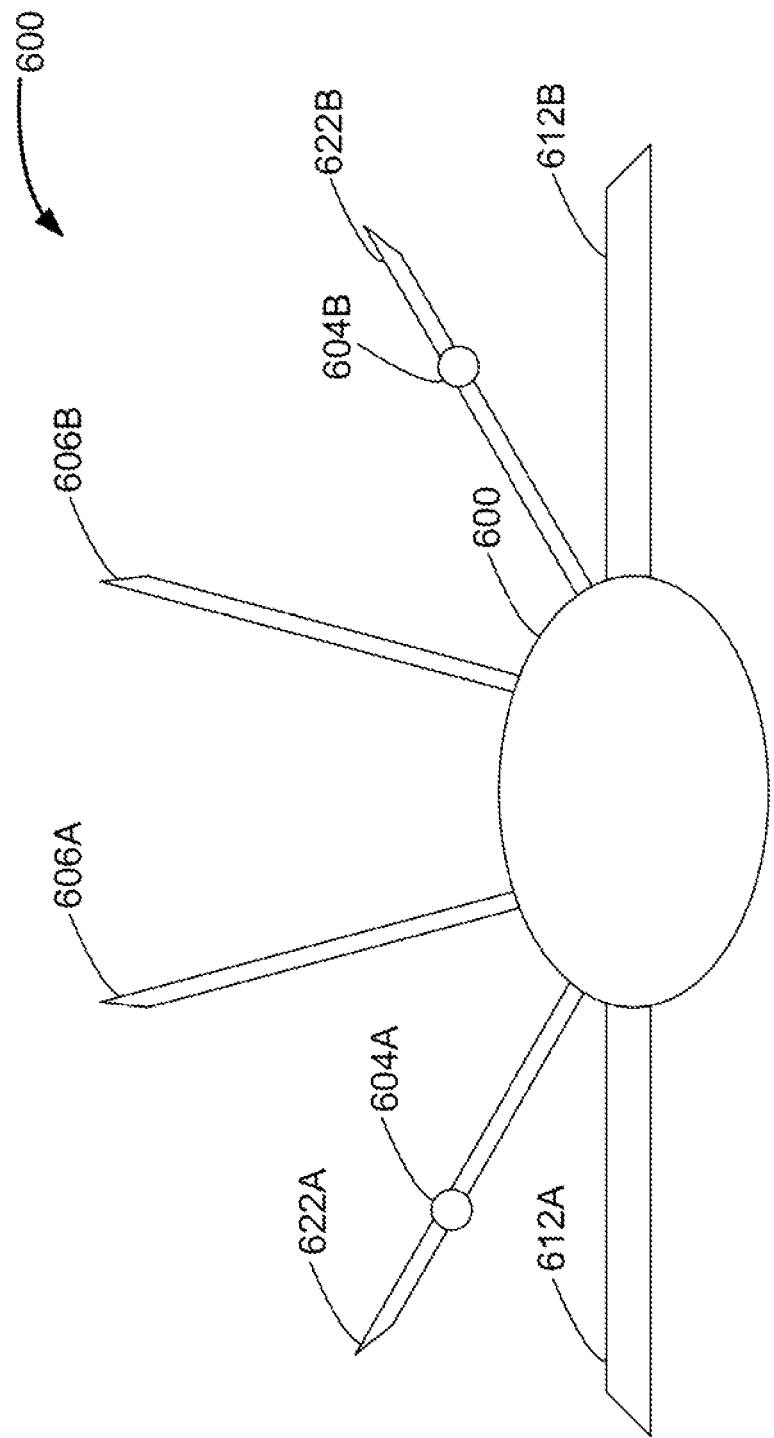
FIG. 6 is a front view of an aircraft with interference bodies installed on shaping appendages according to at least one embodiment disclosed herein.

FIG. 6 a front view of an aircraft 600 with interference bodies 604A and 604B installed on shaping appendages 622A and 622B according to at least one embodiment disclosed herein. In some configurations, it may be desirable to install the interference bodies 604A and 604B on components other than control surfaces. For example, it may be beneficial to cause an interference with compression waves caused by the fuselage of the aircraft 600 at locations other than what may be provided by the vertical control surfaces 606A and 606B. Placing the interference bodies 604A and 604B on components other than control surfaces may provide for the ability fine tune interference patterns above and beyond that which may be provided when installed on control surfaces.

Thus, in the configuration illustrated in FIG. 6, the aircraft 600 can include vertical control surfaces 606A and 606B. The aircraft 600 can also include wings 612A and 612B. The interference bodies 604A and 604B are installed on the shaping appendages 622A and 622B, respectively. In this configuration, the interference body 604A may be used to interfere with compression waves coming from the aircraft 600, the vertical control surface 606A, and/or the wing 612A. It should be understood that the shaping appendages 622A and 622B may be considered a part of, or separate from, the interference bodies 604A and 604B in various configurations. Further, it should be understood that the number, size, location and other aspects of the shaping appendages 622A and 622B illustrated in FIG. 6 and described herein are examples and provided for descriptive purposes only.

In a similar manner, the interference body 604B may be used to interfere with compression waves coming from the aircraft 600, the vertical control surface 606B, and/or the wing 612B. The position of the shaping appendages 622A and 622B and the interference bodies 604A and 604B on the shaping appendages 622A and 622B may be adjusted depending on desired interference. The interference may be adjusted using other methods, such as multiple interference bodies on a single component, as illustrated in FIG. 7.

Figure 7:
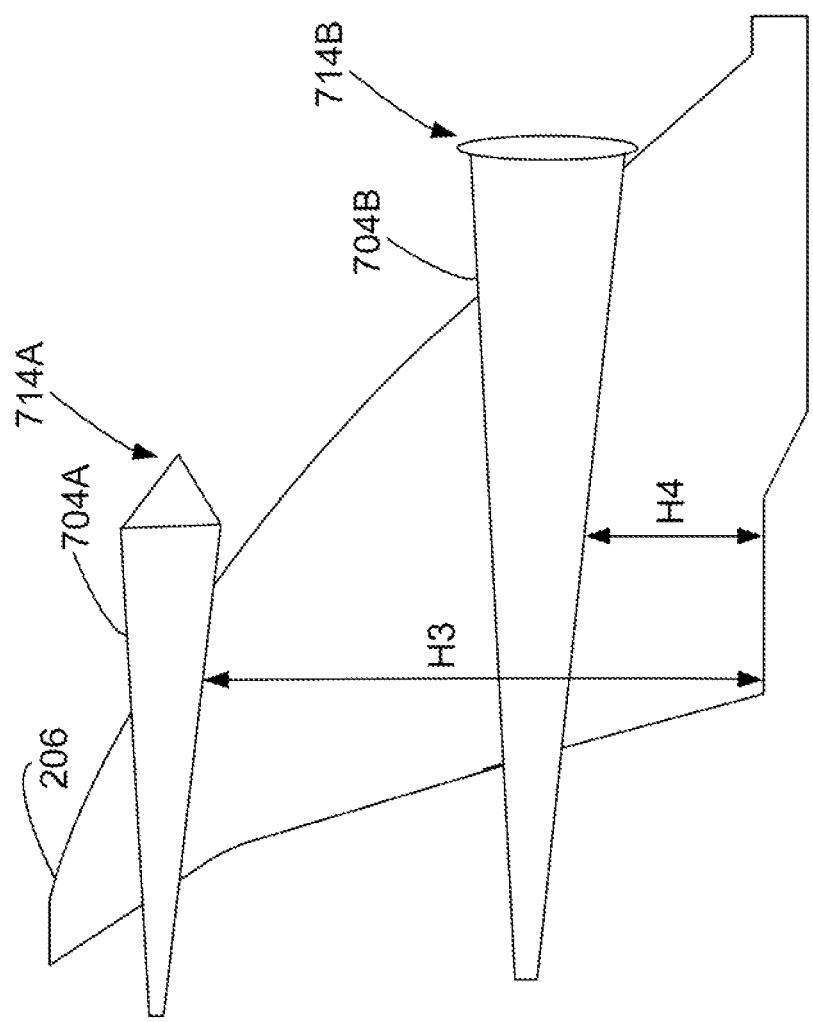
FIG. 7 is a side view of vertical control surface with multiple interference bodies according to at least one embodiment disclosed herein.

FIG. 7 is a side view the vertical control surface 206 with multiple interference bodies according to at least one embodiment disclosed herein. As shown in FIG. 7, the vertical control surface 206 has installed therein interference body 704A and 704B. As illustrated, the interference body 704A is installed at a distance H3 from the bottom of the vertical control surface 206. The bottom of the vertical control surface 206 is the location proximate to the fuselage of the aircraft 200. The interference body 704B is installed at a distance H4 from the bottom of the vertical control surface 206. Although not limited to any particular benefit, multiple interference bodies on a control surface may provide an additional level of shaping the sonic boom of the aircraft 200.

FIG. 7 also illustrates two different shapes of the interference bodies 704A and 704B. The expander section 714A of the interference body 704A has the generally conical shape described above. The expander section 714B of the interference body 704B has a generally planar or flat surface. The different surface shapes, including others not expressly described, but considered to be within the scope of the present disclosure, can cause different compression wave formations from the interference bodies 704A and 704B. These different compression wave formations may be used to provide a higher level of control to shape the sonic boom than what may be provided using only one interference body or shape of the expander section.

In some configurations, the interference bodies 704A and 704B may be used together. For example, the interference body 704A, e.g. the first interference body, may be used to create a first interference compression wave and the interference body 704B, e.g. the second interference body, may be used to create a second interference compression wave. In the example illustrated in FIG. 7, the interference body 704A may have a different volume than the interference body 704B, thus creating a different interference compression wave.

Figure 8:
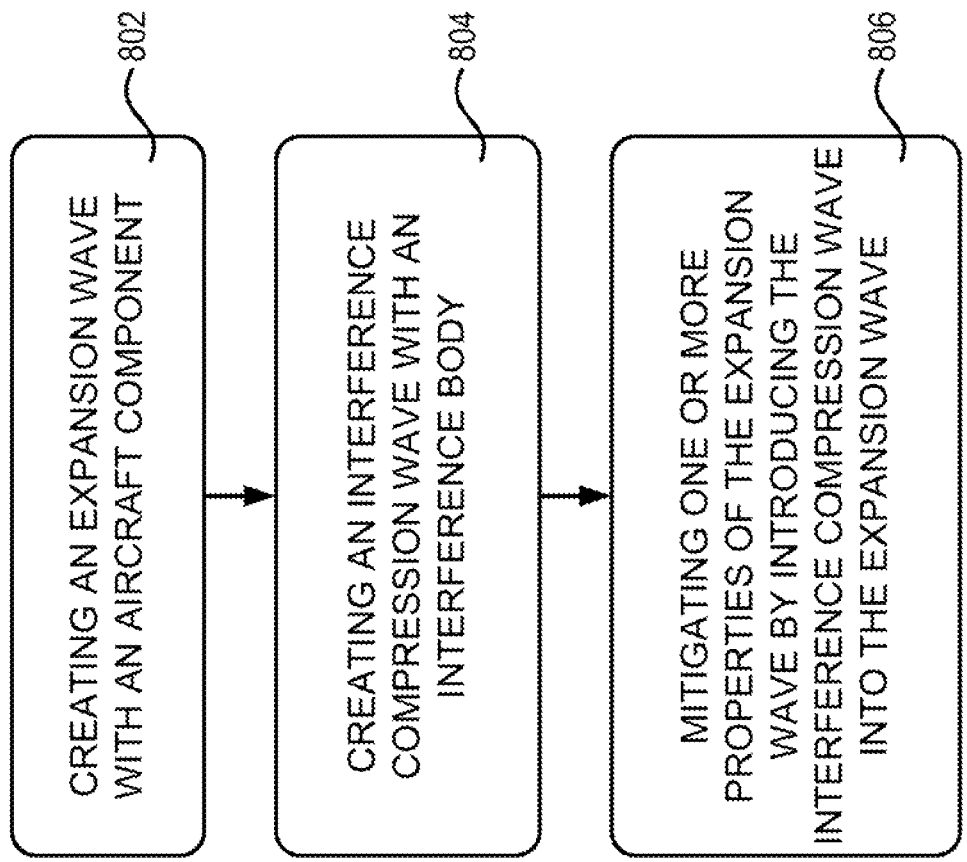
FIG. 8 illustrates one configuration of a routine for altering one or more characteristics of an expansion wave according to at least one embodiment disclosed herein.

FIG. 8 illustrates one configuration of a routine 800 for altering or mitigating one or more characteristics of an expansion wave according to at least one embodiment disclosed herein. Unless otherwise indicated, more or fewer operations may be performed than shown in the figures and described herein. Additionally, unless otherwise indicated, these operations may also be performed in a different order than those described herein.

The routine 800 commences at operation 802, where expansion wave is created by an aircraft component. In some configurations, most exterior aircraft components can, in certain situations, produce expansion wave s that contribute to a shock wave emanating from an aircraft. Some examples include, but are not limited to, the fuselage, wings, control surfaces, and the like. As used herein, an expansion wave can be created by individual components or the expansion wave can be the amalgamation of the effects of various components.

The routine 800 continues to operation 804, where an interference compression wave is created by an interference body. The interference compression wave can have predetermined properties associated with one or more properties of the expansion wave. Some predetermined properties include, but are not limited to, amplitude of the interference compression wave, location of the interference compression wave, and the like. The one or more properties (or characteristics) of the expansion wave can include, but are not limited to, amplitude of the expansion wave, the portion of the N-wave associated with the expansion wave, the location of the expansion wave, and the like.

The routine 800 continues to operation 806, where the one or more properties of the expansion wave are mitigated by introducing the interference compression wave into the expansion wave. The interference compression wave can be introduced in an interference zone. The routine 800 ends thereafter.

Figure 9:
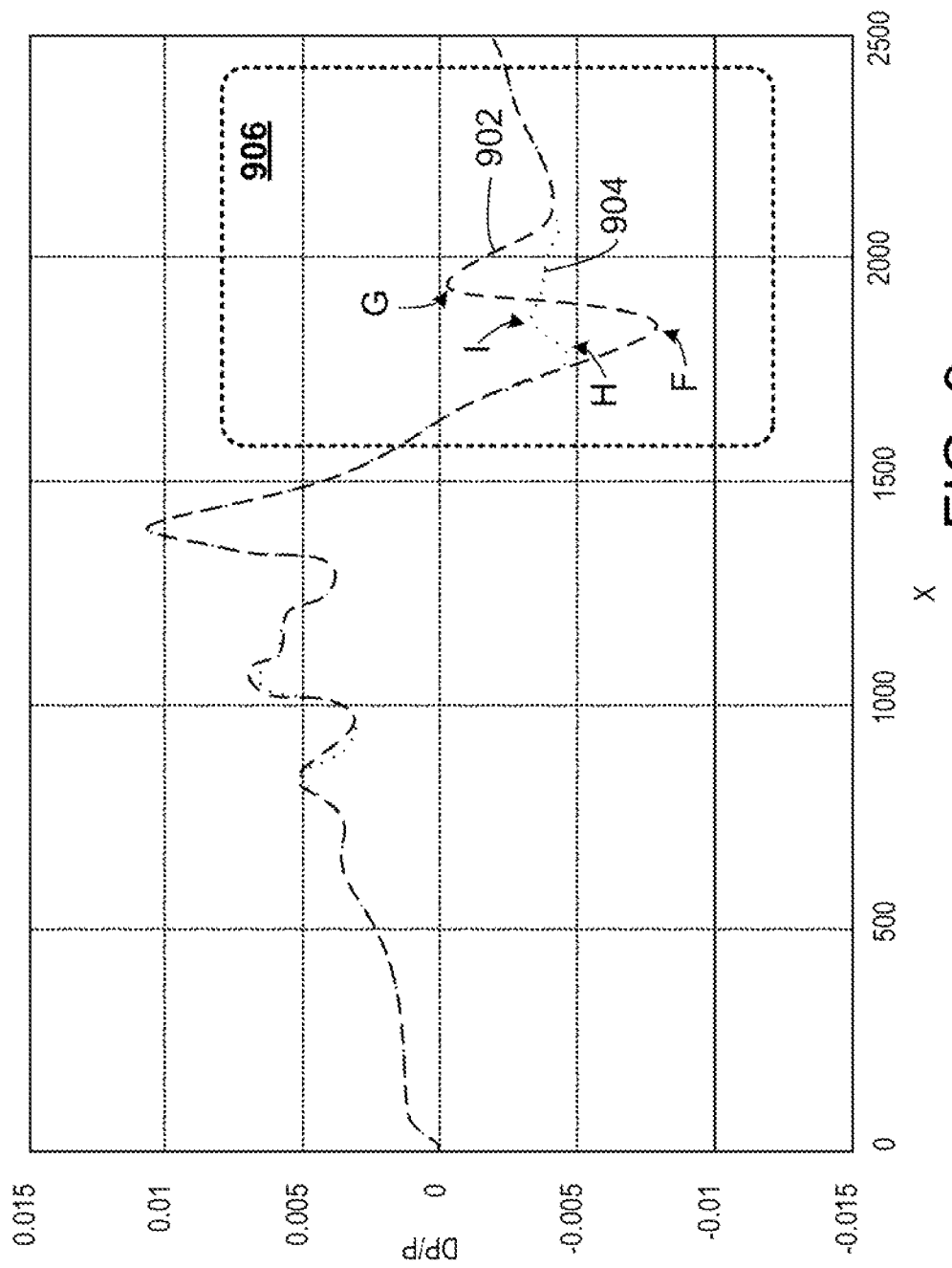
FIG. 9 illustrates in data form the altering a characteristic of a sonic boom according to at least one embodiment disclosed herein.

FIG. 9 illustrates in data form the altering of a characteristic of a sonic boom according to at least one embodiment disclosed herein. The chart 900 in FIG. 9 provides data relating to the sonic boom signatures of two embodiments. Data 902, indicated by a hashed line, is associated with an aircraft without an interference body and data 904, indicated by a dotted line, is associated with an aircraft that uses an interference body. The chart 900 has as an X axis distance following an aircraft moving at supersonic speeds and as a Y axis differential pressure that indicates the amplitude of the sonic boom or N-wave.

As illustrated, the two sets of data are relatively the same until region 906. Region 906 shows the relative amplitude of the N-waves for each of the data 902 and data 904. As noted above, the relatively loudness of the sonic boom depends on factors such as the difference in pressure between the compression wave produced at the nose of the aircraft and the compression wave produced at the tail of the aircraft. A larger difference in pressure often translates to a larger sonic boom, provided other factors such, as distance to ground, are the same.

As can be viewed in the chart 900, the data 902 has a relatively large difference in pressure between data point F and data point G when compared to data point H and data point I associated with the data 904. The relatively large difference between data point F and data point G represents a significant change in pressure, resulting in a relatively large sonic boom. The relatively small difference between data point H and data point I represents a relatively small change in pressure, resulting in a relatively smaller sonic boom than the configuration illustrated in the data 902. The difference in pressure differential illustrated in the chart 900 was effectuated by an interference body.

The subject matter described above is provided by way of illustration only and should not be construed as limiting. Various modifications and changes may be made to the subject matter described herein without following the example embodiments and applications illustrated and described, and without departing from the true spirit and scope of the present disclosure, which is set forth in the following claims.

What is claimed is:

1. An interference body for reducing a sonic boom, comprising:
   an expander section positioned completely aft of wings of an aircraft and forward of a leading edge of a vertical control surface extending from a tail of the aircraft and operative to create an interference pattern to interfere with an expansion wave generated by a component of the aircraft, the vertical control surface defining a tip at an outboard extent of the vertical control surface, and the expander section being supported at a height that is inboard of the tip; and a closeout section coupled to the expander section and operative to produce a benign terminal expansion of compression waves from the interference body.

2. The interference body of claim 1, wherein the interference pattern is provided by a compression wave produced by the expander section.

3. The interference body of claim 1, wherein the interference body is coupled to the vertical control surface of the aircraft.

4. The interference body of claim 3, wherein the interference body is positioned in a centerline configuration along a centerline of the vertical control surface.

5. The interference body of claim 3, wherein the interference body is positioned in an offset configuration offset from a centerline of the vertical control surface.

6. The interference body of claim 1, wherein the interference body is coupled to a shaping appendage affixed to the aircraft, the shaping appendage being other than a control surface.

7. The interference body of claim 1, wherein the expander section comprises a conical shape.

8. The interference body of claim 1, wherein the expander section comprises a planar shape.

9. An aircraft configured to have a reduced a sonic boom signature, the aircraft comprising:
    wings;
    a vertical control surface extending from a tail of the aircraft; and
    an interference body installed completely aft of the wings, the interference body comprising
        an expander section positioned completely forward of a leading edge of the vertical control surface and operative to create an interference pattern to interfere with an expansion wave generated by a component of the aircraft, and
        a closeout section coupled to the expander section and operative to produce a benign terminal expansion of compression waves from the interference body.

10. The aircraft of claim 9, wherein the expander section comprises a conical shape, a planar shape, or a combination thereof.

11. The aircraft of claim 9, wherein the interference body is positioned in a centerline configuration along a centerline of the vertical control surface or in an offset configuration offset from a centerline of the vertical control surface.

* * * * *